United States Patent [19]

Hanaway

[11] Patent Number: 4,664,534

[45] Date of Patent: May 12, 1987

[54] GUIDE SLEEVE, GUIDE POST AND BALL BEARING ASSEMBLY

[75] Inventor: Ronald J. Hanaway, Farmington Hills, Mich.

[73] Assignee: SteelTex Corporation, Farmington Hills, Mich.

[21] Appl. No.: 866,904

[22] Filed: May 27, 1986

[51] Int. Cl.$^4$ .............................................. F16C 29/04
[52] U.S. Cl. ......................................... 384/49; 384/30
[58] Field of Search ...................... 384/16, 30, 48, 35, 384/49, 52, 46, 53, 507–509, 511, 523, 524

[56] References Cited

U.S. PATENT DOCUMENTS

| | | | |
|---|---|---|---|
| 2,774,430 | 12/1956 | Blazek | 384/30 |
| 2,906,563 | 9/1959 | Conner | 384/30 |
| 2,987,348 | 6/1961 | Blazek | 384/30 |
| 3,092,425 | 6/1963 | Conner | 384/30 |
| 3,357,755 | 12/1967 | Danly | 384/49 |
| 3,514,166 | 5/1970 | Coley | 384/49 |

FOREIGN PATENT DOCUMENTS 8502238  5/1985  World Int. Prop. O. ............ 384/49

Primary Examiner—Stuart S. Levy
Assistant Examiner—Thomas R. Hannon
Attorney, Agent, or Firm—Cullen, Sloman, Cantor, Grauer, Scott & Rutherford

[57] ABSTRACT

In combination a guide sleeve, guide post having an exterior longitudinal slot, reciprocally projected into the sleeve and a ball cage mounting a plurality of ball bearings mounted upon the post for relative longitudinal and rotary movements thereon and interposed between the post and sleeve. A roller bearing is mounted within an internal annular recess in the cage and retainingly projects into the post slot limiting longitudinal movements of the cage relative to the post. The ball cage is free for rotary movements relative to the roller bearing, the post and sleeve. A radial bore in the cage is located outwardly of the recess and has notched corners for crosswise insertion of the roller bearing into the post slot and for positioning within the annular recess. A set screw in the bore traps the roller bearing. In a modification, an internal slot in the cage is opposed to the post slot, with the slots guiding the roller into the recess.

4 Claims, 9 Drawing Figures

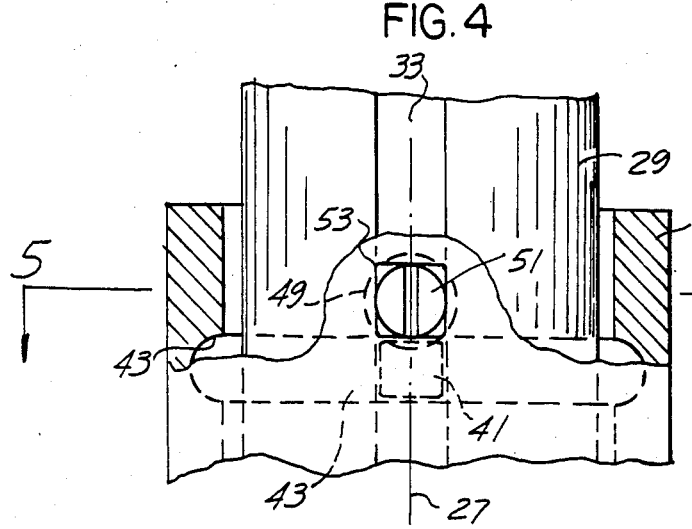
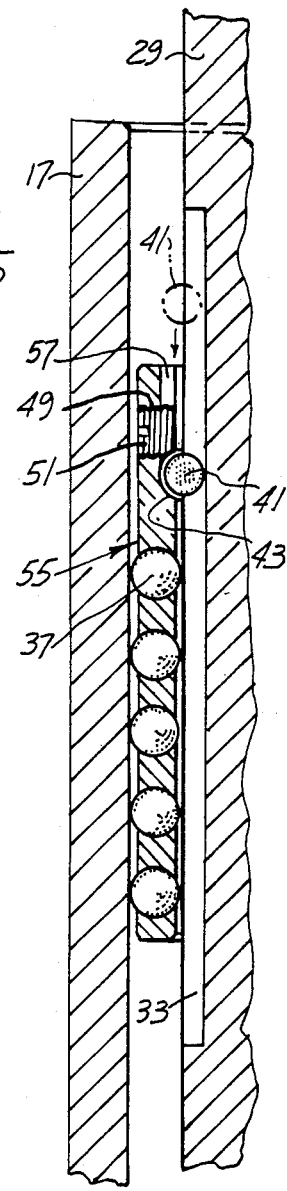
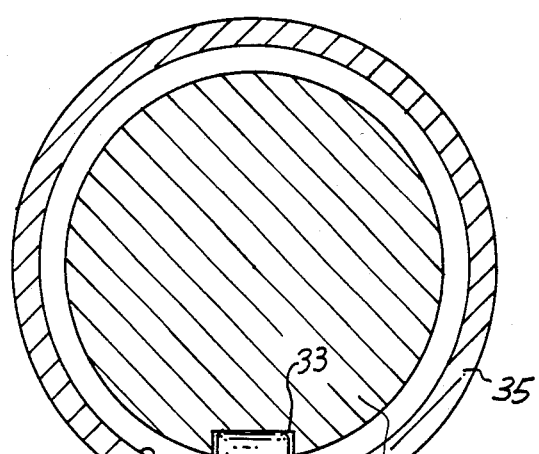
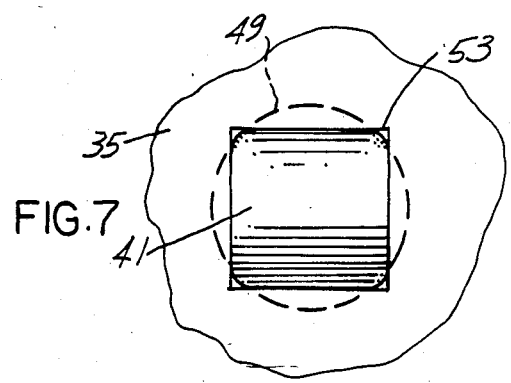
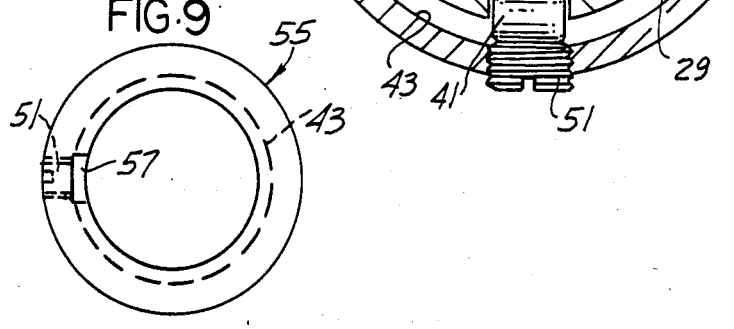
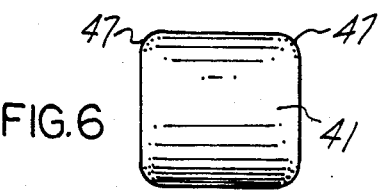

GUIDE SLEEVE, GUIDE POST AND BALL BEARING ASSEMBLY

FIELD OF THE INVENTION

The present invention includes but is not limited to a die set with guide sleeve, guide post and bearing assembly for maintaining the upper and lower die shoes of the die set in alignment during relative reciprocal movements.

THE PRIOR ART

Die set guides relating to the invention are shown in one or more of the following U.S. Patents:

| Name | U.S. Pat. No. | Patent Date |
| --- | --- | --- |
| G. O. Conner | 2,422,774 | June 24, 1947 |
| G. O. Conner | 2,422,775 | June 24, 1947 |
| G. O. Conner | 3,092,425 | June 4, 1963 |
| S. E. Coley | 3,514,166 | May 26, 1970 |

BACKGROUND OF THE INVENTION

Heretofore die sets have included guide sleeves and guide posts and with a ball bearing assembly interposed and wherein the ball bearing assembly is slidably and non-rotatably mounted upon the guide post for longitudinal movements thereon and is interposed between the guide post and sleeve.

While the purpose of interposing the ball bearing cage assembly was to minimize friction between the guide sleeve and guide post, the construction and mounting of the bearing assembly was such that the bearing assembly was constrained to reciprocal rectilinear movements with respect to the guide post and guide sleeve and non-rotatably mounted upon the guide post as by a pair of opposed set screws on the cage riding within opposed longitudinal slots in the guide post.

Since the ball bearing assembly was non-rotatable there was a certain amount of tracking between the bearing assembly and the post and sleeve which was productive of wear and friction during continuous guided reciprocal movements of the guide post with respect to the sleeve.

Heretofore there was a need to maintain reduced friction between the ball bearing assembly the guide post and guide sleeve, and at the same time prevent tracking of the balls with respect to the guide sleeve and guide post.

SUMMARY OF THE INVENTION

It is an important feature of the present invention to provide an improved guide sleeve, guide post and bearing assembly such that while the bearing assembly is guidably mounted upon the guide post for reciprocal movements relative thereto and for corresponding reciprocal movements with respect to a stationary guide sleeve, there is additionally provided means by which the bearing assembly is freely rotatable upon separation of and with respect to the guide sleeve and the guide post.

The invention may be used in other areas wherein there is a reciprocal relative motion between a pair of parts such as the parts of a robotic unit. In order to reduce friction between a pair of telescoped longitudinally relatively reciprocal parts, the present ball bearing assembly is mounted upon the relative movable telescoping parts in such a way that the bearing assembly is free for rotative adjustments with respect to said parts upon separation thereof.

Another feature is to provide an improved guide post, guide sleeve and bearing assembly wherein the ball cage is guidably and reciprocally mounted upon the guide post so as to limit relative longitudinal movements of the bearing assembly with respect to the guide post. The ball cage supports a plurality of longitudinally spaced circular arrangements of ball bearings, which project through the cage, such that the cage or ball bearing assembly is free for relative rotary movement with respect to the longitudinal axis of the corresponding post and sleeve.

It is another feature to provide a roller bearing arrangement between the ball retainer and the guide post such that the ball retainer is free for longitudinal reciprocal movements with respect to the guide post and the sleeve, but has the capability of free rotary adjustment with respect to said guide post and sleeve.

Another feature includes the use of a roller bearing which is positioned within an internal annular recess upon the ball retainer and wherein the roller is constrained to reciprocal rolling movements within an exterior longitudinal slot in the guide post but wherein the ball retainer is free for relative rotary movement with respect to the roller bearing.

As another feature a pair of opposed spaced roller bearings are nested in an annular recess upon the interior of the ball retainer and wherein the roller bearings are registerable within opposed exterior longitudinal slots in the guide post such that end portions of the longitudinal slots limit relative reciprocal movement of the ball bearing assembly and post. The ball retainer is free for rotary movement relative to the spaced roller bearings thereby permitting on separation of the post and sleeve relative rotary adjustment of the ball retainer with respect to the guide post and sleeve.

Another feature includes the formation within the ball cage of a radial bore communicating with an internal annular recess therein with cutaway corner notches to permit assembly of a roller bearing thereinto, together with a set screw threaded into and normally closing said radial bore for trapping the roller bearing within the recess in the cage.

As another feature, in addition to the radial bore adjacent the annular recess and a set screw in the bore, there is provided an internal slot in the bearing cage opposed to the post slot extending to the recess and in registry with said radial bore. The roller is assembled into the recess by rolling within the slots, and thereafter trapped therein by advancing the set screw.

These and other features and objects will be seen in the following specification and claims in conjunction with the appended drawings.

DRAWINGS

FIG. 4 is a fragmentary section of the ball cage and post of FIG. 1, on an increased scale, with the post rotated ninety degrees.

FIG. 5 is a plan section taken in the direction of arrows 5—5 of FIG. 4.

FIG. 6 is a side view of the roller bearing of FIG. 5, on an increased scale.

FIG. 7 is a fragmentary side view of the ball cage of FIG. 4, with corner notches in the set screw bore to receive the roller bearing.

FIG. 8 is a fragmentary vertical section of a part of a post, sleeve, bearing cage illustrating a modified assembly of the roller bearing into the cage.

FIG. 9 is a plan view of the ball cage shown in FIG. 8.

It will be understood that the above drawings illustrate preferred embodiments of the invention, and that other embodiments are contemplated within the scope of the claims hereafter set forth.

DETAILED DESCRIPTION OF AN EMBODIMENT OF THE INVENTION

Figure 1:
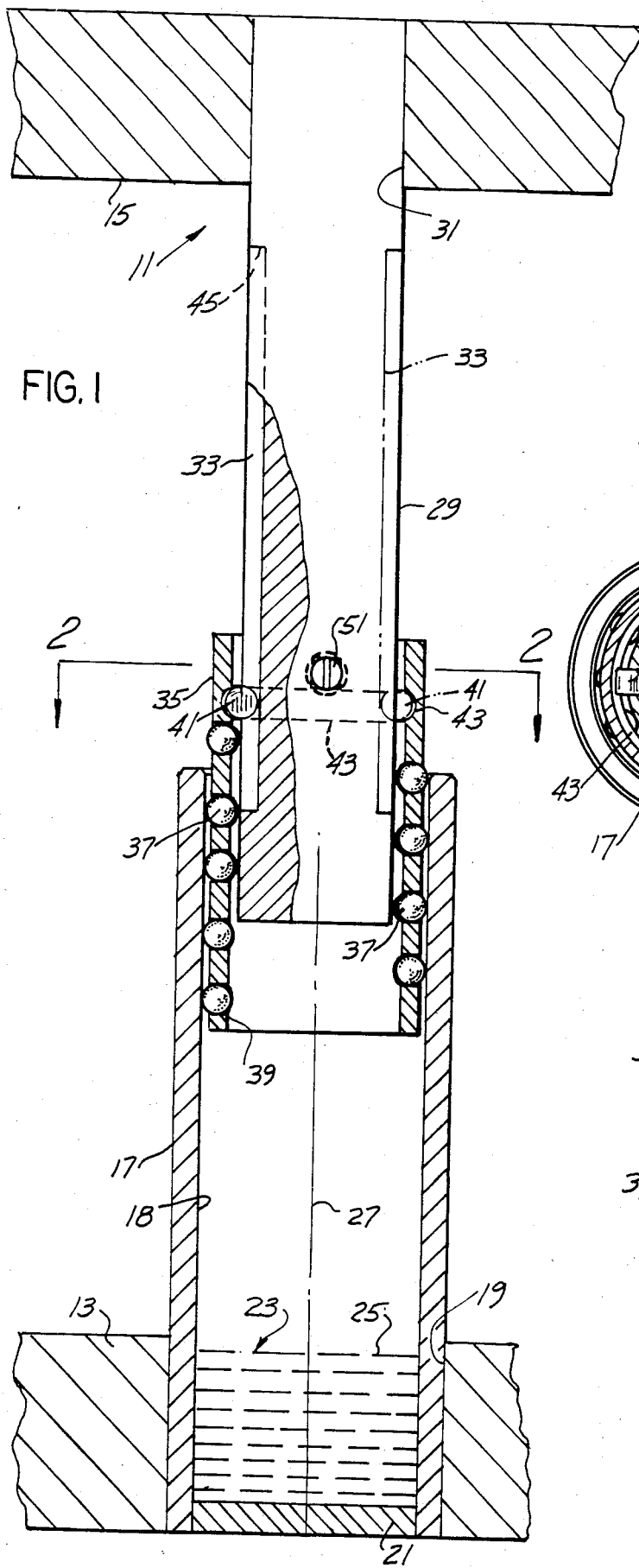
FIG. 1 is a partial vertical section of the present guide post, guide sleeve and ball bearing assembly interposed between upper and lower die shoes of a die set, fragmentarily shown.

Referring to the drawings FIG. 1, the present die set with guide sleeve, guide post and bearing assembly is generally indicated at 11, and includes a die holder or lower die shoe 13, fragmentarily shown. Overlying the lower die shoe 13 is a punch holder 15, fragmentarily shown. It is also referred to as an upper die shoe which is adapted for vertical reciprocal movements with respect to the lower die shoe 13 and with respect to a die set mounted upon the corresponding die shoes in a conventional manner.

The present die set includes the open ended guide sleeve 17 having a cylindrical bore 18 press fitted in an upright position within a corresponding aperture 19 in lower die shoe 13. Plug 21 seals and closes the lower end of sleeve 17 to define oil reservoir 23 within which a quantity of lubricating oil 25 is provided for the self-lubrication of ball bearing assembly 35.

Guide sleeve 17 has a central longitudinal axis 27 and is adapted to receive a corresponding guide post 29 having a similar longitudinal axis. The upper end of the guid post is press fitted within aperture 31 within upper die shoe 15. Elongated guide slot 33 is formed along the length of post 29 on the exterior thereof. A second opposed exterior guide slot 33 is formed upon the opposite side of post 29.

The cylindrical ball cage 35 or ball bearing retainer, in the illustrated embodiment is made of aluminum, and includes a series of longitudinally spaced circles of apertures within whcih are positioned and entrapped or loosely retained a corresponding plurality of spaced ball bearings 37. These are arranged in longitudinally space circles so as to uniformly project through the body of the ball cage exteriorly and interiorly thereof, FIGS, 1, 2 and 3.

Within the ball bearing retainer 35 adjacent the bore 39 therein there is provided an internal annular recess 43 inwardly of one end thereof which receives roller bearing 41. A portion of roller bearing 41 guidably projects into post slot 33. In operation with the present sleeve, post and bearing assembly interposed with respect to the upper and lower die shoes of of a die set 11, slot 33 within guide post 29 cooperatively receives roller bearing 41 limiting relative longitudinal movements of ball bearing assembly 35 along the length of said post.

In the event that the post has an additional oppositely arranged slot 33 therein, there is provided a second roller bearing 41 within the internal annular recess 43 of the ball cage and nested within the second longitudinal slot 33, FIG. 1. During conventional reciprocal movements of post 29 with respect to sleeve 17 and with ball cage 35 mounted upon the post and interposed between the post and sleeve 17, longitudinal reciprocal movements of the post effects corresponding longitudinal movements of ball cage 35 with respect to sleeve 17.

While roller bearing 41 is trapped within recess 33, ball cage 35 is not restrained against rotation with respect to guide post 29 and guide sleeve 17. The ball cage is free for relative rotary adjustments with respect to post 29 and sleeve 17 when said post and sleeve are separated. By providing a ball cage which is free for relative rotation or adjustment, all tracking of the balls in the cage with respect to the post and the sleeve is eliminated and friction is minimized.

In the preferred embodiment bore 18 of sleeve 17 is slightly undersized with respect to the maximum diameter of the ball bearing assembly 35, so that the ball bearings 37 are pre-loaded against post 29. There is at least such sufficient oversize relationship of the ball bearing assembly with respect to the sleeve that there is a preload of the balls with respect to guide sleeve 17.

Communicating with annular recess 43 within ball cage 35 there is a radial insertion bore 49 which is internally threaded. Said bore is arranged longitudinally outward of and in communication with recess 43, FIG. 1. Spaced corner notches 53 are broached in cage 35 outwardly of bore 49, FIG. 7. Said notches and bore provides a means by which the roller bearing 41 may be transversely inserted through the ball cage, positioned in slot 33 and then rolled into internal annular recess 43. Once the roller bearing has been inserted, set screw 51 is threaded into bore 49 to close the bore and to trap the roller beaing or a pair of roller bearings 41, FIG. 1, within recess 43 upon the interior of the ball cage.

Roller bearing 41 perform two functions: one, it provides a means by which the ball cage assembly 35 is limited in its relative longitudinal movements along the length of the guide post 29 with roller bearing 41 engaging the guide post at opposite ends 45 of slot 33. During reciprocal movements of post 29 roller bearing 41 limits movement of the ball cage with respect to opposite end portions of said post.

The second function of roller bearing 41 is to permit free rotation or adjustment of ball cage 35 with respect to said roller bearing trapped within slot 33. Ball cage 35 is free for relative rotary adjustment with respect to roller bearing 41, post 29 and sleeve 17.

In operation bearing assembly 35 rotated so that bore 49 is in registry with slot 33 in post 29, FIG. 4. The special diameter roller bearing 41 is inserted through set screw hole 49-53, FIGS. 5 and 7 and wherein the corners have been notched as at 53 to permit the rectangular cross section of the roller bearing to pass through bore 49 side ways into the interior hidden slot 33 of guide post 29. Successively the bearing 41 is rolled axially into annular recess 43. Thereafter set screw 51, FIGS. 4 and 5, is threaded into place closing off radial bore 49 which is adjacent and displaced from recess 43. Thus, the roller bearing 41 is trapped within annular internal recess 43. Said roller bearing is free to move longitudinally of post slot 33. At the same time, ball bearing retainer 35 is adapted for angular rotative adjustment with respect to said roller or roller bearing, or with respect to a pair of said rollers, FIG. 1.

MODIFICATION

Figure 2:
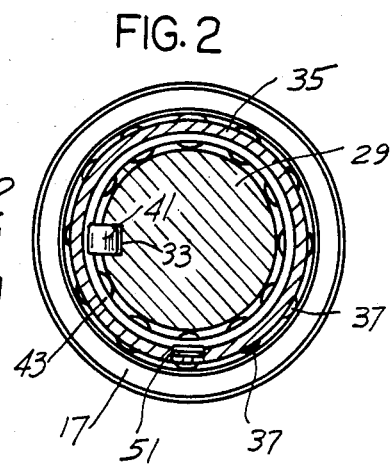
FIG. 2 is a plan section taken in the direction of arrows 2—2 of FIG. 1.
Figure 3:
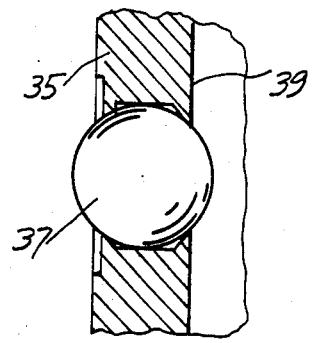
FIG. 3 is a fragmentary section of a portion of the bearing cage of FIG. 1, on an increased scale.

A modified ball retainer is designated at 55 in FIGS. 8 and 9 wherein the environment and assembly is the same as above described with respect to FIGS. 1 and 2. The only change is that instead of employing radial bore 49, FIG. 7 with the notched corners 53 for lateral insertion of the roller bearing, the roller bearing 41 is positioned within post slot 33, FIG. 8.

Upon the interior of ball retainer 55 adjacent one end thereof is an elongated slot or channel 57 which is opposed to post slot 33 extends to and communicates with the internal annular recess 43. Said slot also underlies and is in registry with radial bore 49 which receives set screw 51.

In operation, the roller bearing 41 is positioned within slot 33 and rolled there along and into and along undercut elongated slot 57 within ball retainer 55 until it moves into internal annular recess 43. At that time set screw 51 is threaded into place and sufficiently into slot 57 to block any outward escape of roller bearing 41 from recess 43. Here also set screw 51 is longitudinally displaced from annular recess 43 and extends into channel 57.

Channel 57 is longitudinal and parallel to center line 27 upon the interior of cage 55 and communicates with the interior of the internal annular groove 43. Roller 41 is inserted into groove 33 in the guide post 29 and moves on the inside of the cage through groove 57 into annular recess 43, FIG. 8.

With respect to the mounting of roller bearing 41 within post slot 33, the length of the roller bearing with respect to the width of said slot is such that there is a very small tolerance in the slot width so that the roller being can not get cocked or angularly locked up by rolling back and forth within slot 33.

By replacing the roller bearing 41 for a ball bearing, one improvement is that the roller bearing provides widened contact with post 29 within slot 33. Further the roller bearing slides relative to annular groove 43 upon the interior of the ball bearing assembly 35 or 55. While it is the bearing retainer that does the rotary adjustment, since the roller bearing 41 is constrained to longitudinal movements, the roller bearing slides endwise around the inside diameter of annular groove 43 in the ball retainer. This is due to the engineered length and radius of the roller bearing and in the engineered shape of groove 43 which allows rotational sliding of the roller bearing with respect to said groove take place. If it were not for the proper engineered shape and size of slot 33 in post 29, the shape of roller 41, as in FIG. 6, and the design of groove 43 in the ball cage, no such rotational action could occur.

Due to the slide line contact of roller bearing 41 within post slot 33, there will be no damage to the ball retainer cage as there would be with a single point ball contact if a ball were positioned within slot 33 and carried by the ball retainer. The opposite ends of roller 41 have an annular radii 47 to facilitate movement of the roller bearing within retainer slot 33 and its rolling function.

Having described my invention, reference should now be had to the following claims:

I claim:

1. In combination a guide sleeve having a longitudinal axis, a guide post having a coaxial longitudinal axis projected into said sleeve for relative longitudinal movements;

said post having an external longitudinal slot therein substantially throughout its length;

a cylindrical ball bearing cage mounting a plurality of spaced circularly arranged ball bearings extending substantially the length of said cage and projecting inwardly and outwardly thereof;

said cage being mounted upon said post for relative longitudinal and rotary movement thereon and with respect to said sleeve and interposed between said post and sleeve;

there being an internal annular recess in said cage inwardly of one end thereof;

a roller bearing slidably mounted within said recess and retainingly projected into said post slot and adapted for rolling movements along the length of said slot;

said roller bearing being alternatively registerable with opposite ends of said longitudinal slot, limiting rectilinear movement of the ball cage relative to said post, said longitudinal slot constraining said roller bearing to rectilinear movements;

said ball cage being adapted for rotary adjustment relative to said post and sleeve and sliding movement relative to said roller bearing.

2. In the guide sleeve, guide post and bearing assembly of claim 1, said cage having a radial threaded bore displaced from and longitudinally outward of said recess and communicating with said recess;

there being spaced corner recesses formed in said cage radially outward of said bore defining with said bore a rectangular radial slot in said cage adapted for assembly of the roller bearing thereinto;

and a set screw threaded into and closing said radial bore, said set screw trapping and roller bearing within said cage recess.

3. In the guide sleeve, guide post and bearing assembly of claim 2, said guide post and sleeve being upright and at their outer ends projected into and respectively secured within the upper and lower relatively movable die shoes of a die set assembly.

4. In the guide sleeve, guide post and bearing assembly of claim 1, said cage having a radial threaded bore displaced from said longitudinally outward of said recess and communicating with said recess;

there being an internal channel in said cage in one position of the cage opposed to said post slot, communicating with said annular recess and in registry with said radial bore;

said roller bearing being movable within and along said post slot and cage channel for assembly into said recess;

and a set screw threaded into and closing said radial bore and extending into said channel for retaining said roller bearing within said recess.

* * * * *